United States Patent Office 2,862,537
Patented Dec. 2, 1958

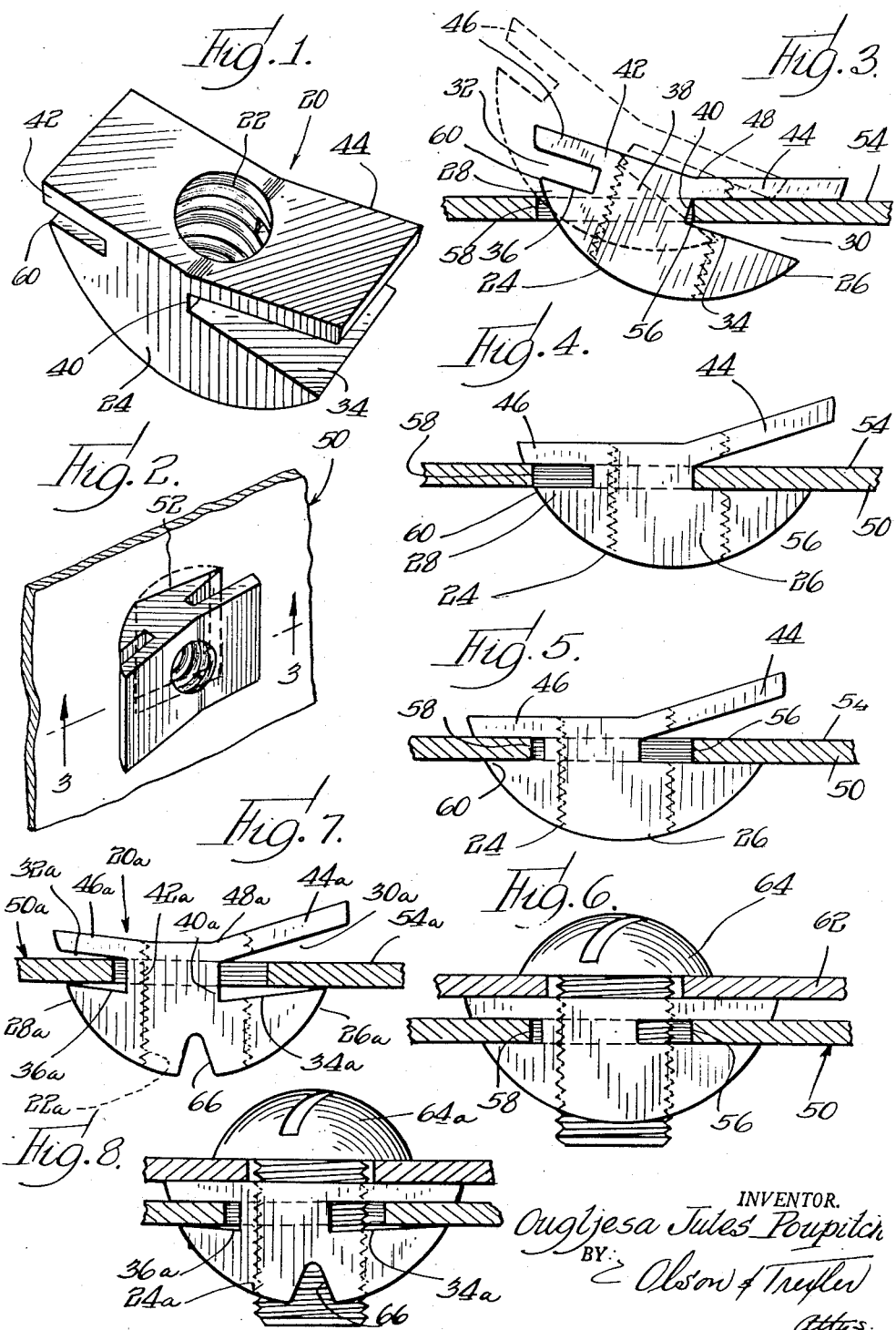

2,862,537

SLIP ON NUT WITH BENDABLE ATTACHING HEAD

Ougljesa Jules Poupitch, Chicago, Ill., assignor to Illinois Tool Works, Chicago, Ill., a corporation of Illinois Application April 12, 1954, Serial No. 422,508

2 Claims. (Cl. 151—41.72)

The present invention relates to a novel combination or assembly of an apertured work piece and nut member adapted to receive screws or bolts.

In the production of various products having a number of sections or panels to be secured together such as automobiles, refrigerators, stoves and the like, it is common practice to provide a work piece or panel with one or more nut members mounted thereon for subsequently receiving screws. Some nuts have been staked to the work piece while other nuts have been connected to the work piece by means of welding or by utilizing secondary parts such as nut retaining cages. In addition, nut members have heretofore been provided which are adapted to be clinched onto the work piece. The usefulness and commercial acceptance of such nut and work piece assemblies is dependent to a great extent upon the ease and mode of applying the nut to the work piece as well as the cost of forming the nut and adapting the work piece to receive the nut. Preferably, a nut of this type should be applied to the work piece from the front since this enables the nut to be used on work pieces which are not excessible from the back or where the structure is completely enclosed like that of fender sections and pillars of automobiles. In general the nut members heretofore provided for assembly with a work piece in the various ways mentioned above have not been entirely satisfactory since the assembly process has been relatively difficult and expensive and the nut members have usually been constructed so that they must be applied to the work piece from the back. It is therefore a primary object of the present invention to provide a novel combination of an apertured work piece and a nut member constructed so that assembly may be obtained relatively rapidly and economically.

A further object of the present invention is to provide a novel combination of an apertured work piece and a clinch nut constructed so that the nut may be easily applied to the work piece from the front.

Still another object of the present invention is to provide a novel combination of the type set forth above wherein the clinch nut is constructed so that it may be easily deformed to grip the work piece in a manner to eliminate substantially any possibility of injury to the nut or the work piece.

A more specific object of the present invention is to provide a novel clinch nut of simple and economical construction, which nut may be relatively easily applied to a work piece.

A further object of the present invention is to provide a novel clinch nut of the general type set forth in the preceding paragraph, which nut is adapted to grip a screw member applied thereto to restrain inadvertent retrograde movement of the screw member.

Other objects and advantages will become apparent from the following description and the accompanying drawings wherein:

Fig. 1 is a perspective view illustrating a novel clinch nut embodying the principles of this invention;

Fig. 2 is a perspective view illustrating the clinch nut partially assembled with a work piece during the process of forming the novel combination of this invention;

Fig. 3 is an enlarged cross sectional view taken along line 3—3 in Fig. 2;

Figs. 4 and 5 are cross sectional views similar to Fig. 3 and further illustrate the manner in which the clinch nut is applied to the work piece;

Fig. 6 is a cross sectional view showing the nut fully applied to the work piece and a second work piece secured in position by a screw member;

Figs. 7 and 8 are similar to Figs. 5 and 6 but illustrate a slightly modified form of the present invention.

Referring now more specifically to the drawings wherein like parts are designated by the same numerals throughout the various figures a nut member 20 embodying one form of the present invention is illustrated in Figs. 1 through 6. The body of the nut member 20 is provided with a threaded aperture 22 which is preferably centrally located. One end portion 24 of the nut body is of considerable axial extent so that a sufficient number of thread convolutions may be obtained to give the nut the desired strength. Opposite sides 26 and 28 of the nut member body portion 24 are rounded and merged together in the manner illustrated. This structure gives the nut substantially maximum strength for a minimum weight or amount of material since the strength of the nut is largely dependent upon the length of the threaded aperture. In addition, these curved sides facilitate application of the nut to the work piece in the manner described below.

In order to adapt the nut member 20 for application to a work piece radially extending recesses 30 and 32 are provided in the opposite sides 26 and 28 respectively. Generally radially extending surfaces 34 and 36 define one side of the recesses 30 and 32 and an axially extending web or shank portion 38 provides the recesses respectively with bottom surfaces 40 and 42. The opposite side of the recess 30 is provided by a tab 44 integral with and extending from the web portion 38 and the opposite side of the recess 32 is provided by a somewhat similar tab 46. Preferably the nut member 20 is made from deformable metal and the tab 44 is bent as at 48 so that it extends not only radially but also somewhat axially from the web portion 38. However, it should be noted that the tab 44 extends at a relatively small acute angle to a plane normal to the axis of the nut and this angle is preferably made as small as possible so that bending of the tab 44 may be maintained at a minimum.

The nut member 20 is adapted to be applied to a panel or work piece 50 having an aperture 52 therein. This panel may be a part of various products such as automobiles, refrigerators or any other structure which may desirably include a preassembled work piece and nut member. The nut member and work piece are constructed so that the nut member may be assembled from a front surface of the work piece which in the illustrated embodiment is designated by the numeral 54. In order that this result may be obtained the aperture 52 is formed in the work piece so that opposite edges or margins 56 and 58 thereof are spaced apart a predetermined distance and this distance is substantially equal to but slightly greater than the distance between the bottom 40 of the recess in the nut side 26 and a point 60 on the opposite side 28 of the nut and located substantially at the mouth of the recess 32. Furthermore, this manner of assembly is facilitated by the fact that the side 28 is curved or inclined inwardly from the mouth of the recess 32.

The method of assembling the nut member and work piece is best illustrated in Figs. 3–6. As shown in broken lines in Fig. 3 the corner of the side 26 is first inserted through the aperture 52 and this step is permitted by reason of the slightly axially flaring or inclined position of the tab 44. The nut is then advanced to the solid line position shown in Fig. 3 so that the edge 56 of the work piece engages the bottom 40 of the recess 30. The nut may then be swung to the position shown in Fig. 4 and it should be noted that the tabs 44 and 46 are longer than the radially extending surfaces 34 and 36 respectively so as to prevent the nut member from passing entirely through the aperture. In order to reduce the width of the opening 52 the recess 30 is preferably made deeper than the recess 32 so that the bottom 40 intersects and is interrupted by the centrally located threaded aperture 22. Thus, during assembly of the nut member to the work piece the edge 56 of the work piece may actually enter into the aperture 22 as shown best in Fig. 4. It is therefore seen that the width of the work piece opening may be reduced since the distance between the bottom 40 and the point 60 on the nut member is substantially less than it would be if the bottom 40 were positioned so that it did not intersect the central aperture 22. Furthermore, this structure may be utilized to facilitate application of the nut member to the work piece since with the parts at the position shown in Fig. 4 a tapered tool, not shown, may be inserted into the aperture 22 to engage the edge 56 of the work piece and force the nut member laterally so that the edge 58 of the work piece enters into the recess 32. However, it should be understood that the nut members of this invention may be easily assembled with a work piece without requiring any special tools.

From the position shown in Fig. 4 the nut member is shifted laterally either by hand, by a tapered tool as mentioned above, or by a special tool that will be described fully hereinbelow. This action causes the work piece to enter into the recess 32 and at the same time causes the edge 56 of the work piece to be withdrawn from within the threaded aperture 22 as shown in Fig. 5. The tab member 44 is then deformed axially toward the cooperating clamping surface 34 to grip the work piece as shown in Fig. 6. At any desirable subsequent time a second panel 62 may be connected to the panel or work piece 50 and nut member assembly by means of a screw member 64. In the meantime the nut member is securely retained in a desired position by the clinched tabs 44 and 46. It should be noted that the tab may be relatively easily deformed or clinched since it initially extends radially or substantially radially as distinguished from substantially axially extending tabs of clinch nuts heretofore in use.

In Figs. 7 and 8 there is illustrated a slightly modified form of the present invention which is similar to the embodiment described above as shown by the application of identical numerals with the suffix *a* added to identical parts. The difference in the embodiment of Figs. 7 and 8 is that the nut member 20a is adapted to grip the screw member 64a to restrain inadvertent retrograde movement thereof. This is accomplished by forming the generally radially extending clamping surfaces 34a and 36a so that they are inclined slightly in the manner illustrated and by providing the end of the nut member with a generally V-shaped recess 66. With this structure upon tightening of the screw member 64a the portions of the nut member on opposite sides of the V-shaped recess 66 tend to collapse inwardly so as to grip the screw.

From the above description it is seen that the present invention has provided a novel work piece and nut assembly which is of simple and economical construction and which may be easily put together. In addition, it is seen that the present invention has provided a novel structure whereby a nut member may be readily applied to the work piece from the front of the work piece. More specifically it is seen that the present invention has provided a novel clinch nut of simple and economical construction, which clinch nut may be easily applied to a work piece from the front of the work piece. In addition, it will be appreciated that the present invention has provided a novel clinch nut preferably made of deformable metal which nut is constructed so as to obtain substantially maximum strength with use of a minimum of material. However, the present invention also contemplates that in certain instances plastic materials having suitable characteristics may be used to form the clinch nut. When using such plastic materials the clinch nut may be formed substantially identically to the above described deformable metal embodiments except that in the event a flexible plastic such as nylon is used, the tab 44 will be constructed so that it initially extends radially in a manner similar to the tab 46 since the tab 44 could be flexed axially outwardly to permit the initial application of the nut member to the work piece.

While the preferred embodiments of the present invention have been shown and described herein it is obvious that many structural details may be changed without departing from the spirit and scope of the appended claims.

The invention is claimed as follows:

1. A clinch nut for application to a sheet material work piece having an opening therein with opposite edges spaced apart a predetermined distance, said clinch nut comprising a body member having a threaded axially extending aperture therethrough and oppositely and generally radially extending recesses in opposite sides thereof, said recesses each being defined by axially spaced surfaces adapted to receive one of said work piece edges therebetween, and one of said recesses being deeper than the other recess and having a bottom intersecting and interrupted by the threaded aperture and spaced from the opposite side of said body member a distance similar to said predetermined distance with said predetermined distance being slightly greater to permit application of the nut to the work piece, said body member including an entering end portion insertable through a workpiece opening and having a substantial portion of said threaded aperture therein, and said entering end portion having a recess intersecting said threaded aperture to induce inward collapsing of the body member upon the application of a screw member thereto for gripping the screw member and restraining inadvertent retrograde movement thereof.

2. A one-piece metallic clinch nut for assembly with an apertured workpiece from one side thereof; and comprising an aperture-entering body, a shank extending axially from said body for disposition within the workpiece aperture, and a head connected to the opposite extremity of said shank; adjacent sections of said body and said head on opposite sides of said shank being disposed in superposed spaced relation and providing work accommodating recesses extending radially inwardly from the outer periphery of the clinch nut; the head, shank and body being traversed by a screw accommodating internally threaded aperture positioned substantially centrally of the clinch nut, said head being of a substantially uniform axial thickness which is substantially less than the maximum thickness of said body, the said body being substantially rigid and of an axial thickness along the threaded aperture greater than the head and corresponding to a substantial portion of the diameter of the threaded aperture whereby to accommodate multiple thread convolutions, the work accommodating recess on one side of the shank being of a greater radial depth than the opposite recesses and extending into and interrupting the continuity of the thread convolutions in said aperture and reducing the transverse extent of the shank in this area, the distance between the inner edge of the workpiece accommodating recess of greater radial depth and the remote outermost edge of the body being not greater than the corresponding dimension of the workpiece aperture, the surface of the body adjacent the aforesaid remote outermost edge thereof being relieved so that the distance between the inner edge of the workpiece accommodating aperture of greater radial depth and points along the said surface of the body is less than the distance from the inner edge of the workpiece accommodating recess of greater radial depth and the outermost edge of the body to permit assembly with the workpiece, and the portion of the head defining the workpiece accommodating recess of greater radial depth being initially and inherently deformed outwardly to provide a relatively large throat opening to receive the adjacent portion of the workpiece on insertion of the clinch nut in the apertured workpiece and thereafter deformed toward the body to a set position engaging the workpiece, and said shank being non-circular in cross section so as to cooperate with the complementary aperture in the workpiece in counteracting rotation of the clinch nut when a screw is rotatably applied thereto.

References Cited in the file of this patent

UNITED STATES PATENTS

| | | |
|---|---|---|
| 792,884 | Eicher | June 20, 1905 |
| 991,447 | Kennedy | May 2, 1911 |
| 1,824,083 | Hoff | Sept. 22, 1931 |
| 1,912,100 | Rosenberg | May 30, 1933 |
| 2,098,997 | Bramming | Nov. 16, 1937 |
| 2,105,139 | Demboski et al. | Jan. 11, 1938 |
| 2,178,308 | Newman | Oct. 31, 1939 |
| 2,310,532 | Langmaid | Feb. 9, 1943 |
| 2,379,752 | Schultz | July 3, 1945 |
| 2,629,157 | O'Herron | Feb. 24, 1953 |
| 2,665,730 | Trumble | Jan. 12, 1954 |

FOREIGN PATENTS

| | | |
|---|---|---|
| 503,900 | Great Britain | Apr. 17, 1939 |